UNITED STATES PATENT OFFICE.

WILLIAM STEWART, OF PORTSMOUTH, OHIO.

IMPROVEMENT IN YEAST SUBSTITUTES.

Specification forming part of Letters Patent No. 211,870, dated February 4, 1879; application filed August 9, 1878.

*To all whom it may concern:*

Be it known that I, WILLIAM STEWART, of the city of Portsmouth, county of Scioto, and State of Ohio, have invented a new and useful Compound, called "Stock Yeast Meal," which compound is fully described in the following specification.

This invention relates to that class of compounds used in making yeast; and it consists in a composition formed by mixing hops and barley—one-eighth hops and seven-eighths barley, by weight—and the same ground together into a meal. This meal, not having been wet, malted, or fermented, will not mold or sour, and, not having started to work, will therefore retain its fermentative power.

The yeast is prepared in the following manner: Put one ounce of meal into a gallon jug or jar; then take three pints of hot water and stir in wheat-flour sufficient to make a thin batter or paste, and, when cooled to a milk-warm temperature, put the same in the vessel containing the meal, cork up tight, and let stand for from twelve to twenty-four hours, according to the temperature in which it is kept.

The flour is scalded to cause sweet fermentation, and the paste is cooled before mixing with the meal, because the meal should not be scalded.

I claim—

A compound consisting of hops and barley ground into a meal, for the purpose of making yeast without boiling or malting, substantially as and for the purpose specified.

WILLIAM STEWART.

Witnesses:
    S. F. REBER,
    G. MILES.